(No Model.)

C. D. FOX.
MACHINE FOR BINDING AND SHOCKING GRAIN.

No. 261,543. Patented July 25, 1882.

Witnesses:
Frank S. Blanchard
William A. Cokman

Inventor:
Cyrus D. Fox
By Charles F. White
his Attorneys

UNITED STATES PATENT OFFICE.

CYRUS D. FOX, OF ROSCOE TOWNSHIP, WINNEBAGO COUNTY, ILLINOIS.

MACHINE FOR BINDING AND SHOCKING GRAIN.

SPECIFICATION forming part of Letters Patent No. 261,543, dated July 25, 1882.

Application filed December 2, 1881. (No model.)

*To all whom it may concern:*

Be it known that I, CYRUS D. FOX, a citizen of the United States, residing in the township of Roscoe, in the county of Winnebago and State of Illinois, have invented certain new and useful Improvements in Machinery for Binding and Shocking Grain; and I do hereby declare that the following is a full, clear, and exact description of the same, reference being had to the accompanying drawings, forming a part of this specification.

My invention has relation to a new method of binding and shocking grain, consisting essentially of conveying or placing the same, when cut, in a pivoted box mounted on low wheels, and then compressing it, by means of the leverage of a compressing-arm working over in connection with a concave head-block placed immediately in front of said box, into a shock of convenient size, and then binding the shock and dumping it in a standing position; and it further consists in the specific machinery and devices for that purpose, hereinafter particularly described and claimed.

Figure 1:
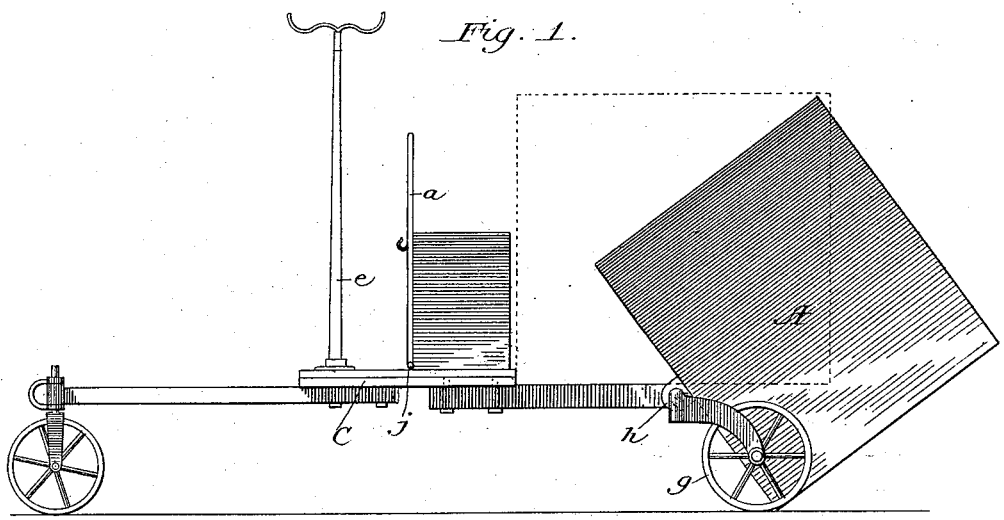
Figure 2:
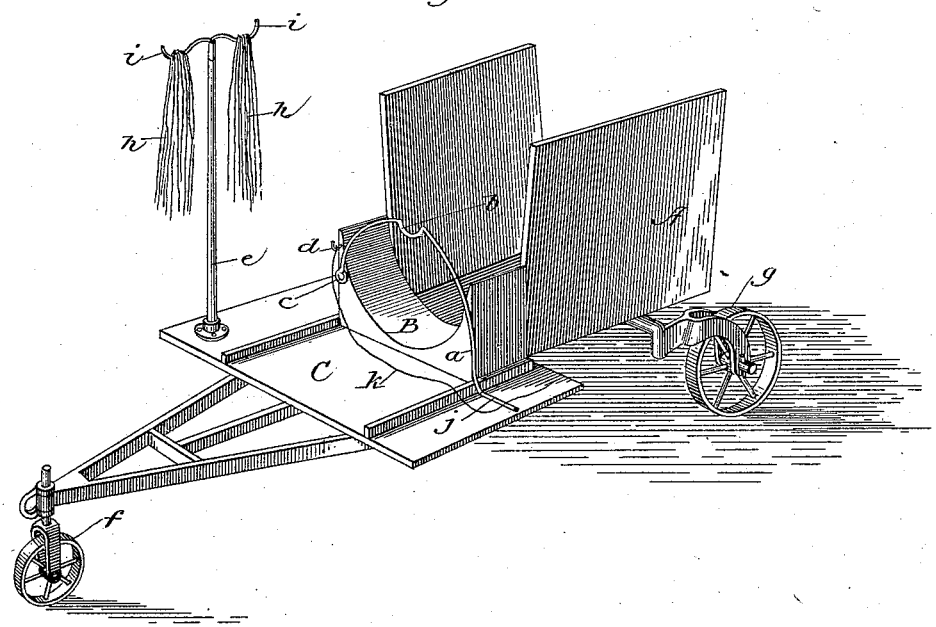

In the accompanying drawings, Figure 1 is a side view, and Fig. 2 is a perspective view, of a machine embodying and illustrating my invention.

A is a box, open at both ends, adapted to receive the grain, and, in connection with the block B and compressing-arm *a*, makes the shock and holds it until bound. Said box is made slightly flaring outward at its sides and rear end to facilitate the delivery of the shock, and may be of any desired dimensions, according to the size of the shock required; but for ordinary grain should be made about three feet square. Below and immediately back of its center-line, at *h*, said box is pivoted to the axle or to a cross-piece fastened to the framework of the wagon or car, and is so adjusted as to easily dump the shock when turned to a standing position.

B is an adjustable concave head-block, placed on the platform immediately in front of the box A, and so adjusted that the heads of the grain, when placed in said pivoted box, will extend over in front of said block.

*a* is a compressing arm or lever for compressing the grain into proper shape for binding.

*b* is a curve in said arm, designed to depress the shock at the point where the band is to be tied. Said arm is pivoted on one side of said block, at *c*, and is provided with the projecting handle *j*, which also serves as a foot rest or lever for holding the shock in position when the band is being tied.

*d* is a pin or hook for holding one end of the twine band in convenient position for the binder, and *e* is an upright rod or stake with a hook at the top for holding the twine bands. Said bands should be previously prepared for ready use by being cut in proper length and provided with a loop in one end.

The head-block B is adjustable and adapted to move forward and backward on the platform C, so as to adjust the machine to the different lengths of straw of the grain to be bound.

The wagon bed or platform upon which the box A and head-block B, with their attachments, are placed may be of any convenient form, and may be independent of the reaper, and mounted as shown in the accompanying drawings, or connected directly with a reaping-machine.

As an independent binder and shocker, the method of using said machine is as follows: The grain to be bound is, by means of gavel-forks, placed in the box A, the grain-heads extending out over the head-block B. When the box or press is full the compressing-arm *a* is swung over and pressed down until the handle *j* is brought in contact with the platform, in which position it is held by the foot of the operator while he ties the band. This done, the arm is released and the pivoted box A swung back, dumping the shock in a standing position. By moving the adjustable head-block forward on the platform said machine is capable of being used to great advantage as a corn and sugar-cane harvester. In applying it to such use, the corn or sugar-cane, having been cut and placed in the machine, is bound into shocks and dumped in a standing position in the same manner as grain.

Having fully described my invention, what I claim as new, and desire to secure by Letters Patent, is—

In a grain binding and shocking machine, the combination of the pivoted box A, the adjustable concave head-block B, provided with the compressing-arm *a*, and platform C, substantially as shown, and for the purpose specified.

CYRUS D. FOX.

Witnesses:
J. B. DOW,
S. P. GRAY.